United States Patent
Kitazawa et al.

(10) Patent No.: US 7,589,488 B2
(45) Date of Patent: Sep. 15, 2009

(54) MOTOR CONTROL APPARATUS

(75) Inventors: Takashi Kitazawa, Fukuoka (JP); Kazuhide Takao, Fukuoka (JP); Yasuyuki Takei, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 271 days.

(21) Appl. No.: 11/632,296

(22) PCT Filed: Jul. 11, 2005

(86) PCT No.: PCT/JP2005/012740

§ 371 (c)(1), (2), (4) Date: May 3, 2007

(87) PCT Pub. No.: WO2006/006552

PCT Pub. Date: Jan. 19, 2006

(65) Prior Publication Data
US 2007/0229016 A1 Oct. 4, 2007

(30) Foreign Application Priority Data
Jul. 13, 2004 (JP) ............................. 2004-206292

(51) Int. Cl.
G05B 11/42 (2006.01)

(52) U.S. Cl. .................... 318/609; 318/271; 318/433

(58) Field of Classification Search .......... 318/268, 318/271, 432, 433, 568.25, 578, 609, 610
See application file for complete search history.

(56) References Cited

U.S. PATENT DOCUMENTS

| | | | | |
|---|---|---|---|---|
| 3,644,892 A | * | 2/1972 | Szymber et al. | 340/825.78 |
| 3,866,100 A | * | 2/1975 | Palenchar et al. | 318/257 |
| 3,866,215 A | * | 2/1975 | Havel | 341/33 |
| 4,161,679 A | * | 7/1979 | Kohn et al. | 318/685 |
| 4,224,501 A | * | 9/1980 | Lindbom et al. | 219/124.34 |
| 4,236,104 A | * | 11/1980 | Spence | 318/567 |
| 5,350,982 A | * | 9/1994 | Seib | 318/139 |
| 5,592,057 A | * | 1/1997 | Kordik | 318/162 |
| 2003/0169002 A1 | * | 9/2003 | Hughes | 318/376 |

FOREIGN PATENT DOCUMENTS

| | | |
|---|---|---|
| JP | 5-11803 A | 1/1993 |
| JP | 6-318284 A | 11/1994 |
| JP | 7-33541 U | 6/1995 |

(Continued)

*Primary Examiner*—Bentsu Ro
(74) *Attorney, Agent, or Firm*—Sughrue Mion, PLLC (57) ABSTRACT

There is provided a motor control apparatus for setting, changing, resetting a control gain or a notch filter frequency Nf without using a parameter inputting apparatus, considerably reducing a procedure required in adjustment of the gain which has been needed from introducing the motor control apparatus until normal operation thereof, and capable of being simply dealt with even by an unskilled person.

There is constructed a simple constitution including 2 pieces of rotary switches (1, 2) which are inexpensive and provided with small mounting areas as an input setting apparatus and 5 of LED (5) as a display apparatus, selecting a gain by a contact of the rotary switch, automatically setting a machine resonance filter frequency by detecting a generated vibration frequency, and only changing the rotary switch for temporarily releasing and resetting the control gain or the notch filter frequency Nf.

17 Claims, 5 Drawing Sheets

FOREIGN PATENT DOCUMENTS

| | | |
|---|---|---|
| JP | 9-114413 A | 5/1997 |
| JP | 3229926 B2 | 9/2001 |
| JP | 2003-189653 A | 7/2003 |
| JP | 2003-319673 A | 11/2003 |
| JP | 2003-333874 A | 11/2003 |
| JP | 2004-7955 A | 1/2004 |

* cited by examiner

| MOTOR ELECTICITY CONDUCTION SIGNAL ON: ELECTRICITY CONDUCTION OFF: ELECTRICITY NONCONDUCTION | COMMAND PULSE ON: INPUT OFF: NONE | POSITION DEVIATION CLEAR SIGNAL ON: INPUT OFF: NONE | SWITCHING ON EXTERNAL DISPLAY APPARATUS 2 LED Gr: GREEN LED Or: ORANGE LED |
|---|---|---|---|
| OFF | ON | OFF | BLINK Or |
| OFF | OFF | OFF | SWITCH OFF |
| OFF | ON | ON | SWITCH ON Gr BY ONLY 1 SECOND IN BLINKING Or AND BLINK Or AGAIN |
| OFF | OFF | ON | SWITCH OFF |
| ON | ON | OFF | BLINK Gr |
| ON | OFF | OFF | SWITCH ON Gr |
| ON | ON | ON | SWITCH ON Or ONLY BY 1 SECOND IN BLINKING Gr AND BLINK Gr AGAIN |
| ON | OFF | ON | SWITCH ON Or BY ONLY 1 SECOND IN BLINKING Gr AND SWITCH ON Gr AGAIN |

MOTOR CONTROL APPARATUS

TECHNICAL FIELD

The present invention relates to a motor control apparatus capable of being adjusted simply by reducing a number of setting a plurality of gains or filters and capable of reducing a procedure necessary for staring operation in a motor control apparatus capable of being set in accordance with a characteristic of a machine by changing a response characteristic of a motor.

BACKGROUND ART

According to a motor control apparatus of a background art, as a method of setting a gain or a filter, an integral time constant, a position proportional gain Kp, a torque command filter or the like of a speed control portion is calculated from a proportional gain Kv of the speed control portion and an arbitrary digital value is set and stored as an inner parameter. There is such an apparatus setting a certain index (in this case, one parameter gain) from a method of setting a parameter of a servo amplifier.

For example, a motor control apparatus of Patent Reference 1 includes a proportional integral calculating portion, and includes a speed control portion for controlling an angular speed of a motor, when either of a proportional gain (Kv), an integral time constant (Ti) of the speed control portion is set, a gain setting portion capable of setting other gain such that a relationship indicated by the following Equations (1) and (2), or Equations (3) and (4) is always maintained, $$2\pi \cdot Kv \cdot Ti \geq Cpi \text{ (case of proportional integral control type)} \quad (1)$$

where Cpi is a constant which can be set by the following condition $$Cpi \geq 4 \quad (2)$$

$$2\pi \cdot Kv \cdot Ti \geq Cip \text{ (case of integral proportional control type)} \quad (3)$$

where Cip is a constant which can be set under the following condition $$Cip \geq 2 \quad (4),$$

a first compensating portion for carrying out proportional calculation, a second compensating portion for carrying out integral calculation, an inputting portion for adding a torque signal (Tref) of the motor outputted by the speed control portion and an output of the first compensating portion and output of the second compensating portion to be inputted to an equivalent rigid model, and inputting a difference signal constituted by subtracting an output of the equivalent rigid model from a speed signal of the speed control portion to the first compensating portion and the second compensating portion, and a vibration detecting portion defining a proportional gain of the first compensating portion by a product a first gain ($\zeta$s) by a second gain ($\omega$s), defining an integral gain of the second compensating portion by square of the second gain, constituting the second gain ($\omega$s) by multiplying the proportional gain (Kv) of the proportional calculating portion of the speed control portion by a previously set band setting coefficient ($\alpha$), comparing an absolute value of a difference signal between the output of the equivalent rigid model and the predicted speed signal of the speed control portion with a previously set detecting speed level, and capable of detecting large or small thereof. Further, in addition to the speed control portion of the motor control apparatus, the motor control apparatus includes a phase control apparatus and when a proportional gain (Kp) of the position control apparatus and either of a proportional gain (Kv), an integral time constant (Ti) of the speed control portion are set, such that a relationship indicated by Equations (1) and (2) mentioned above, or Equations (3) and (4) and equations (5) and (6) shown below is maintained, $$Kp \cdot Ti \leq Cp \text{ (integral proportional control type)} \quad (5)$$

where Cp is a constant which can be set under the following condition $$Cp \leq 0.32 \quad (6),$$

a gain setting portion capable of setting other gain. Further, according to a method of setting the gain of the motor control apparatus, when a vibration detecting output is present from the vibration detecting portion, a gain setting portion automatically reduces the proportional gain (Kv) by about 10%, and reduces the proportional gain (Kv) repeatedly until the vibration detecting output is not present.

Further, a control parameter adjusting apparatus of a servo motor in Patent Reference 2 is an apparatus of adjusting a plurality of control parameters used for controlling the servo motor. The apparatus includes a first modifying portion for modifying at least one control parameter in the plurality of control parameters, a calculating portion for calculating a change in the at least one control parameter modified by the modifying portion, and a second modifying portion for modifying control parameters other than the at least one control parameter modified by the first modifying portion in the plurality of control parameters based on the calculated change (refer to, for example, Patent Reference 2). A position proportional gain, a speed proportional gain or the like is set for a gain setting apparatus at inside of a servo amplifier by way of a key input portion, a display portion, a storing portion or the like by communicating the servo amplifier with a computer in this way.

In this way, according to the motor control apparatus of the background arts, there is adopted a constitution of setting the gain or the filter time constant at inside of the motor control apparatus by inputting a numerical value for setting of the parameter or the like by an operating person by constituting an inputting apparatus thereof by a computer or an exclusive operator such that an arbitrary value thereof can be taken as finely as possible in order to determine other gain or filter time constant while maintaining a constant rate thereof with the one gain from the relationship with the one gain.

Patent Reference 1: JP-A-2003-189653 (FIG. 2)
Patent Reference 2: JP-A-06-319284 (FIG. 1, FIG. 2, FIG. 7)

DISCLOSURE OF THE INVENTION

Problems to be Solved by the Invention

According to the motor control apparatus of the background arts, a control gain value of the proportional gain Kv, the integral time constant Ti, the position proportional gain Kp, the torque command filter Tf or the like of the speed control portion is arbitrarily set. Therefore, an exclusive outer setter is needed for setting, changing an arbitrary digital value as the inner parameter, and a parameter operating apparatus including a parameter input change switch of a switch or the like for setting, and a parameter display for making the operating person recognize the digital value is needed. Therefore, there poses a problem that a number of constituent parts of the motor control apparatus is increased, as a result, cost of fabricating the motor control apparatus is high by that amount, and a number of steps necessary for fabrication is increased.

Further, according to the inner parameter, normally, pluralities of parameter numbers and parameter values need to be set by digital values, and therefore, these are set by one or several pieces of parameter input operating apparatus, and therefore, in order to change the parameter value differently, it is necessary to change an operating style such that the parameter number is changed, the parameter value in correspondence with the number is changed or the like. Although these operations are carried out only in a short period of time in attaching the motor control apparatus to a machine, at first, the apparatus is operated, and a response is confirmed, it is difficult for other than a skilled operating person to carry out a method of operating these in a short period of time without fail.

Further, although even when designed to dispense with the parameter input apparatus, the control gain or the like determines a response characteristic, and therefore, the operating person can determine the control gain, a notch filter frequency Nf constituting a filter of a countermeasure against resonance of a machine which is changed by a characteristic of the machine is automatically set after subjecting the response from the machine to frequency analysis. Therefore, with regard to the once set notch filter frequency Nf, when the notch filter frequency Nf stored to the motor control apparatus does not coincide with a resonance frequency of an actual machine characteristic by significantly changing the machine characteristic at a later stage, interchanging the motor control apparatus, or interchanging the motor to a motor having a different rated power capacity, there also poses a problem that the parameter inputting apparatus is needed, an operation of confirming, changing, resetting effectiveness or ineffectiveness of the notch filter, or the notch filter frequency Nf is needed.

The invention is carried out in view of such a problem, and an object thereof is as follows.

(1) There is provided a motor control apparatus which can simply be dealt with even by an unskilled person for setting, changing, resetting a control gain or a notch filter frequency Nf without using the parameter input apparatus and considerably reducing a procedure required for adjusting the gain which has been needed from introducing the motor control apparatus until normally operating the motor control apparatus.

(2) The control apparatus is downsized by changing a control gain by only changing setting by a single rotary switch without using a setter for setting an arbitrary parameter value for adjusting a plurality of control gains.

(3) Even in a case of significantly changing a characteristic of a machine to which the motor control apparatus is attached, the case is made to be able to be set to deal therewith by only changing the switch.

(4) In order to deal with continuous setting of the control gain as well as setting a new gain, or a function of the machine, the motor, or the motor control apparatus in a clearly different characteristic, it is made possible to significantly change a value of the gain, the filter value set to the switch and to change the control gain of the motor control apparatus which is not set to the switch.

(5) An excessively large vibration by a resonance frequency of the machine which may be brought about in driving the machine first by the motor control apparatus is prevented beforehand, the machine is prevented from being destructed, or a danger is prevented from being brought about to an operating person or a person at a periphery of the machine.

Means for Solving the Problems

In order to resolve the above-described problem, there is provided a motor control apparatus including:

a speed control portion including a proportional integral calculating portion for controlling an angular speed of a motor, a position control portion including a proportional integral calculating portion for controlling an angle of the motor, a setting portion for setting values of a proportional gain (Kv) of the position control portion, a proportional gain (Kv) of the speed control portion, an integral time constant (Ti) of the speed control portion, a lowpass filter time constant (Tf) of a torque command filter for inputting a torque command outputted from the speed control portion, and a low pass filter time constant (Tp) of a position acceleration/deceleration filter arranged at a prestage of the position control portion for smoothing a rapid variation in a position command, and a first switching portion allocated with the values of the speed control proportional gain Kv, the position control proportional gain Kp, the speed control integral time constant Ti, the torque command low pass filter Tf, and the position command low pass filter time constant Tp in steps by certain constant rates relative to the set values or arbitrary values.

Further, there is provided a motor control apparatus including:

a speed control portion including a proportional integral calculating portion for controlling an angular speed of a motor, a position control portion including a proportional integral calculating portion for controlling an angle of the motor, a setting portion for setting values of a proportional gain (Kp) of the position control portion, a proportional gain (Kv) of the speed control portion, an integral time constant (Ti) of the speed control portion, a lowpass filter time constant (Tf) of a torque command filter for inputting a torque command outputted from the speed control portion, a notch filter, a notch filter setting portion thereof arranged at a post stage of the torque command filter, a first switching portion allocated with the values of the speed control proportional gain Kv, the position control proportional gain Kp, the speed control integral time constant Ti, the torque command low pass filter Tf by certain constant rates relative to the set values or arbitrary values, and a setting portion for releasing instantly the notch filter set with a notch filter setting before changing the first switching portion by switching to set the first switching portion, resetting the notch filter frequency value from the vibration frequency analyzing portion to the torque command value as a new output immediate after switching the first switching portion, and simultaneously setting the set value to the setting storing portion.

Further, there is provided the motor control apparatus, further including:

a setting storing portion for storing the set value of the first switching portion always in an involatile memory.

Further, there is provided the motor control apparatus, further including:

an command pulse selecting portion for selecting a code signal and a pulse row, or a regular rotation row command and an inverse rotation pulse row command as an command of a pulse row command of the position command, selecting a logic of the pulse signal, and selecting an command resolution, and a second switching portion allocated with respective set values of the command pulse selecting portion.

Further, there is provided the motor control apparatus, wherein in resetting the notch filter, in a case of shutting off a power source of the motor control apparatus, when the first switching portion is changed, the set value of the first switching portion in inputting the power source at a preceding time which is stored to the setting storing portion in an initializing processing in inputting the power source and the set value of the first switching portion in inputting the power source at a current time are compared, and the notch filter is reset only when the values differ from each other.

Further, there is provided the motor control apparatus, further including:

a change detecting portion for detecting that the second switching portion is changed in inputting the power source.

Further, there is provided the motor control apparatus, wherein an alarm is displayed at an alarm display portion when the second switching portion is changed in inputting the power source at the change detecting portion.

Further, there is provided the motor control apparatus, wherein after the second switching portion is changed and an alarm display portion issues an alarm in inputting the power source, when returned to a position before the change again, a display of the alarm at the alarm display portion is stopped.

Further, there is provided the motor control apparatus, wherein a light emitting portion of the alarm display portion LED or a liquid crystal or the like is switched on or intermittently blinked.

Further, there is provided the motor control apparatus according to claim 1 or 2, further including:

an external display portion for inputting a motor electricity conduction signal and displaying at least one of whether the motor is brought into a conductive state, whether the command pulse row is correctly inputted, and whether a signal of clearing a position deviation to null is inputted.

Further, there is provided the motor control apparatus, further including:

an external display portion capable of informing an operating person of a content of a case of bringing about an abnormality in the motor control apparatus.

Further, there is provided the motor control apparatus, wherein the notch filter setting portion is operated cooperatively with a change in the value of the first switching portion, the first switching portion is changed after temporarily setting the notch filter frequency Nf, when the set value is changed, the vibration frequency at the time point is received again from the frequency analyzing portion, and a value thereof is set again to the notch filter.

Further, there is provided the motor control apparatus according to claim 1 or 2, wherein the first switching portion is a rotary switch or a dip switch or a piano switch.

Thereby, the following operation and function are provided. That is, the control gain can be changed by only changing the setting by one rotary switch without using a setter for setting an arbitrary parameter value for adjusting a plurality of the control gains for determining a response of inside of the motor control apparatus, by using the rotary switch having a small area occupied in an operating portion disposed at a surface of the downsized motor control apparatus, a total of the apparatus can be realized to downsize, and also an occupied area of a board disposed at inside of the motor control apparatus for mounting electronic parts can similarly be reduced.

Further, not only an arbitrary control gain set by an operating person but also the notch filter frequency Nf for a machine resonance frequency particular to a machine can automatically be set and can automatically be reset by only changing one of the rotary switches, and therefore, even in a case of significantly changing a characteristic of the machine attached with the motor control apparatus, the case can be dealt with by only changing the switch.

Further, even in a case of shutting off the power source of the motor control apparatus, when the rotary switch is changed, in an initializing processing in inputting the power source of the motor control apparatus, a change from a state at a preceding time in which the power source is inputted can be detected, and a content set by the operating person can be realized even with regard to a problem which is not brought about by a method of setting a parameter value which can be processed only when the power source is inputted.

Further, in addition to setting the control gain of the rotary switch continuously, the gain can be set newly, values of the gain, the filter value set to the rotary switch in order to deal with functions of the machine, the motor, the motor control apparatus having clearly different characteristics can significantly be changed, and the control gain of the motor control apparatus which is not set to the rotary switch can be changed.

Effect of the Invention

The invention achieves the following effect by the above-described means.

(1) There is provided the motor control apparatus setting, changing, resetting the control gain or the notch filter frequency Nf without using the parameter input apparatus, considerably reducing a procedure required for adjusting the gain which has been needed from introducing the motor control apparatus until normal operation and capable of being dealt with simply even by an unskilled person.

(2) The control apparatus is downsized by changing the control gain by only changing the setting by one rotary switch without using a setter for setting an arbitrary parameter value for adjusting a plurality of control gains.

(3) Even in a case of significantly changing the characteristic of the machine attached with the motor control apparatus, the case can be dealt with by setting the control gain by only switching the switch.

(4) In addition to setting the control gain continuously, the gain can be set newly, the values of the gain, the filter value set to the switch in order to deal with functions of the machine, the motor, the motor control apparatus having clearly different characteristics can be changed significantly, and the control gain of the motor control apparatus which is not set to the switch can be changed.

(5) An excessively large vibration by the machine resonance frequency which may be brought about in driving the machine first by the motor control apparatus is prevented beforehand, the machine is prevented from being destructed, and an injury is prevented from being inflicted on the operating person or a person at a periphery of the machine.

DESCRIPTION OF REFERENCE NUMERALS AND SIGNS 1 rotary switch 1
2 rotary switch 2
3 pulse setting table
4 gain, filter setting table
5 LED
10 speed control portion
11 position control portion
12 motor
13 encoder
14 angular speed calculating portion
15 frequency analyzing portion
16 frequency setting portion
17 notch filter
18 torque command filter
19 position acceleration/deceleration filter
20 position command pulse row
21 pulse input apparatus
22 display portion
23 external display apparatus 1
24 external display apparatus 2
25 alarm display apparatus
30B before changing rotary switch 1
30A after changing rotary switch 1
31 rotary switch 1 detecting portion
32B before changing rotary switch 2
32A after changing rotary switch 2
51 rotary switch 2 setting and storing portion
52 rotary switch 2 resetting portion

BEST MODE FOR CARRYING OUT THE INVENTION

Embodiments of the invention will be explained in reference to the drawings as follows.

EMBODIMENT 1

Figure 1:
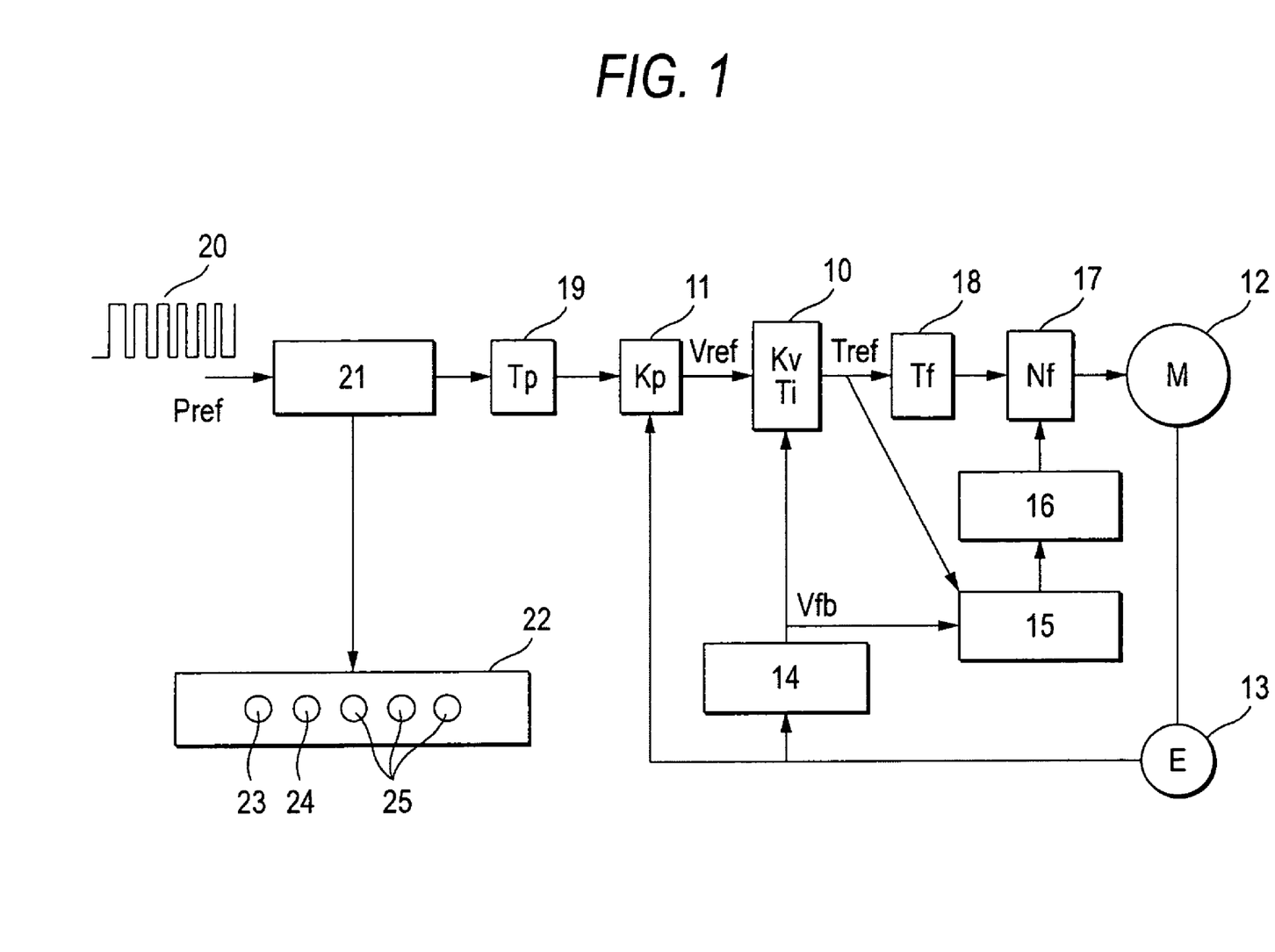
FIG. 1 is a view of a total of a motor control apparatus showing a first embodiment of the invention.
Figure 2:
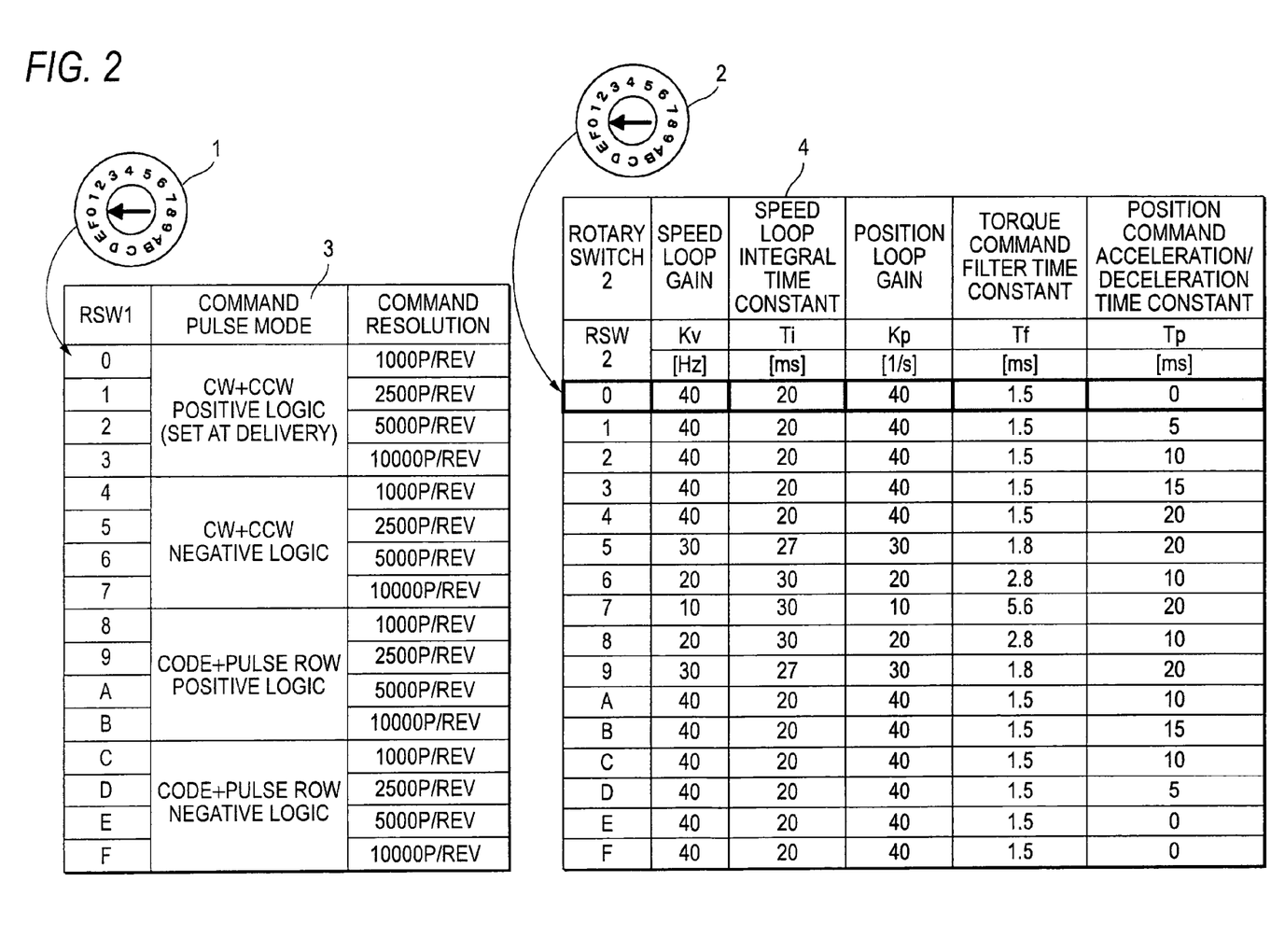
FIG. 2 is a diagram showing a table setting a pulse and a table setting a gain, a filter of the first embodiment of the invention.

FIG. 1 is an outline block diagram of a motor control apparatus of the invention. In FIG. 1, numeral 10 designates the speed control portion, numeral 11 designates the position control portion, numeral 12 designates the motor, numeral 13 designates the encoder, numeral 14 designates the angular speed calculating portion, numeral 15 designates the frequency analyzing portion, numeral 16 designates the frequency setting portion, numeral 17 designates the notch filter, numeral 18 designates the torque command filter, numeral 19 designates the position acceleration/deceleration filter, numeral 20 designates the position command pulse row, numeral 21 designates the pulse input portion, numeral 22 designates the display portion. The display portion 22 is constituted by 23 of the external display apparatus 1, 24 of the external display apparatus 2, 25 of the alarm display apparatus. FIG. 2 is a diagram showing a pulse setting table and a gain/filter setting table of the first embodiment, in FIG. 2, numeral 1 designates a rotary switch 1 constituting a second switching portion, numeral 2 designates a rotary switch 2 constituting a first switching portion, and when movable switching portions in arrow marks of center portions thereof are changed from outside to be set values, set contents of corresponding set numbers of the pulse setting table 3 and the gain, filter setting table 4 (FIG. 2) previously stored to an involatile storing apparatus at inside of the motor control apparatus are respectively set as inner constant of the motor control apparatus.

Here, the pulse setting table 3 outputs an command pulse row for operation to the motor control apparatus from a higher order command apparatus or the like constituted by a sequencer or the like of a programmable controller, NC, a machine controller or the like which is currently widely used. The pulse setting table 3 constitutes a total of 16 kinds of pulse set values of a total of 4 kinds of pulse modes of pulse command modes by two phases pulse outputting system of CW and CCW and codes and pulse row commands which are general in an industrial field as a constitution of controlling a motor as well as logically inverted respective combinations, and a total of 4 kinds of pulse numbers (command resolutions) necessary for operating the motor by one rotation of 1000 pulses, 2500 pulses, 5000 pulses, 10000 pulses.

Other than these, there is a pulse mode constituted by pulses of 90° phase of A phase, B phase. Further, the command resolution is determined from a pulse row output frequency which can be outputted by the higher order apparatus and a maximum revolution number of the motor. That is, when the command resolution is 1000P/REV, an command pulse frequency Prefx necessary for rotating the motor by a maximum revolution number of Vmax ($min^{-1}$) is, $$Prefx = (Vmax/60) \times 1000 \tag{7}$$

and the above-described setting is constituted since the set values are determined thereamong.

Respective control gains and filters of the gain, filter setting table 4 are constituted by relationships indicated by the following equations from values provided by multiplying relationships easily derived from stability of Routh-Hurwitz in a case of constituting a secondary system indicated by Equations (1) through (6) of, for example, JP-2003-189653 (Patent Reference 1) by a safety factor and an empirical law.

$$Kv \cdot Ti \geq 4/2\pi \tag{8}$$

$$Kp = Kv \tag{9}$$

$$Tf = 0.04/Kv \tag{10}$$

constant is increased at equal differences from 0 ms to 20 ms in order to restrain a vibration mainly caused by rapid acceleration of the motor by smoothing a steep command from the higher order apparatus until a value of the set value RSW2 of the rotary switch of 0 through 4. When an operating person changes the set value of the rotary switch 2 in steps from 0 to 4, the set width is set in consideration of an effect of making the response dull by an command filter and an increase in positioning setting time at equal differences. Further, when the set value of RSW2 is from 5 to 7, even in a case in which the vibration cannot be restrained by the set value of from 0 to 4, the vibration can be restrained by reducing the response characteristic by reducing the speed proportional gain. Further, at this occasion, the position command acceleration/deceleration time constant is set as 20, 10, 20 because the position command acceleration/deceleration time constant is set in accordance with the fact that the speed proportional gain is reduced, at the same time, the position proportional gain is reduced, and the positioning setting time is prolonged.

In setting the set values from 8 to F, the same values are set on in order of from F to 8 by inverting the gain, filter settings from 0 through 6. This is for preventing the vibration or the like from being generated in the machine by a large or small difference of the proportional gains of the set values even when the operating person is erroneously set to F when the operating person changes from 0 to 1.

In FIG. 1 constituting the control block diagram of the invention, according to a control block at inside of the motor control apparatus, when the position command pulse row 20 is inputted from outside, the position command pulse row is inputted to the position acceleration/deceleration filter 19 by way of the pulse input apparatus 21 for forming the position command Pref from the inputted mode of the pulse and the command resolution. Here, a low pass filter is constituted by the position acceleration/deceleration time constant Tp, at this occasion, not the low pass filter but a so-to-speak S character acceleration/deceleration filter of a moving average or the like can also be used, in this case, although a memory capacity used as an inner buffer is increased more than the low pass filter, a shock in starting or stopping can be made to be as small as possible.

According to the rotary switch 1, when a value thereof is changed in inputting power source, it is confirmed that the value is changed clearly for the operating person, and in operating the motor successively, the motor is safely operated by the correct setting, and therefore, an alarm is issued by switching on, switching off LED by using the alarm display apparatus 22 at a constant period or arbitrarily, even when the set value of the rotary switch 1 is changed in inputting the power source, in an inner processing, the set value is not set to a currently set new value but is set to value before the change. As other alarming method, there is conceivable other method of displaying a portion or a total of an alarm character or a numeral by one or a plurality of 7 segments LED although there is a problem of an installing area.

Further, when the operating person changes the rotary switch 1 in inputting the power source, the alarm display apparatus 25 issues the alarm, and the rotary switch 1 is returned to a position before the change again, the alarm of the alarm display apparatus is stopped.

Numeral 23 designates the external display apparatus 1, showing LED which is switched on when an inner voltage falls in a previously set range of a voltage value by detecting the inner voltage in a case of inputting the power source of the filter control apparatus. Or, a display by one or a plurality of 7 segment LED can be carried out, and the user is made to be able to confirm that the motor control apparatus is brought into an electrically conducted state.

Figure 6:
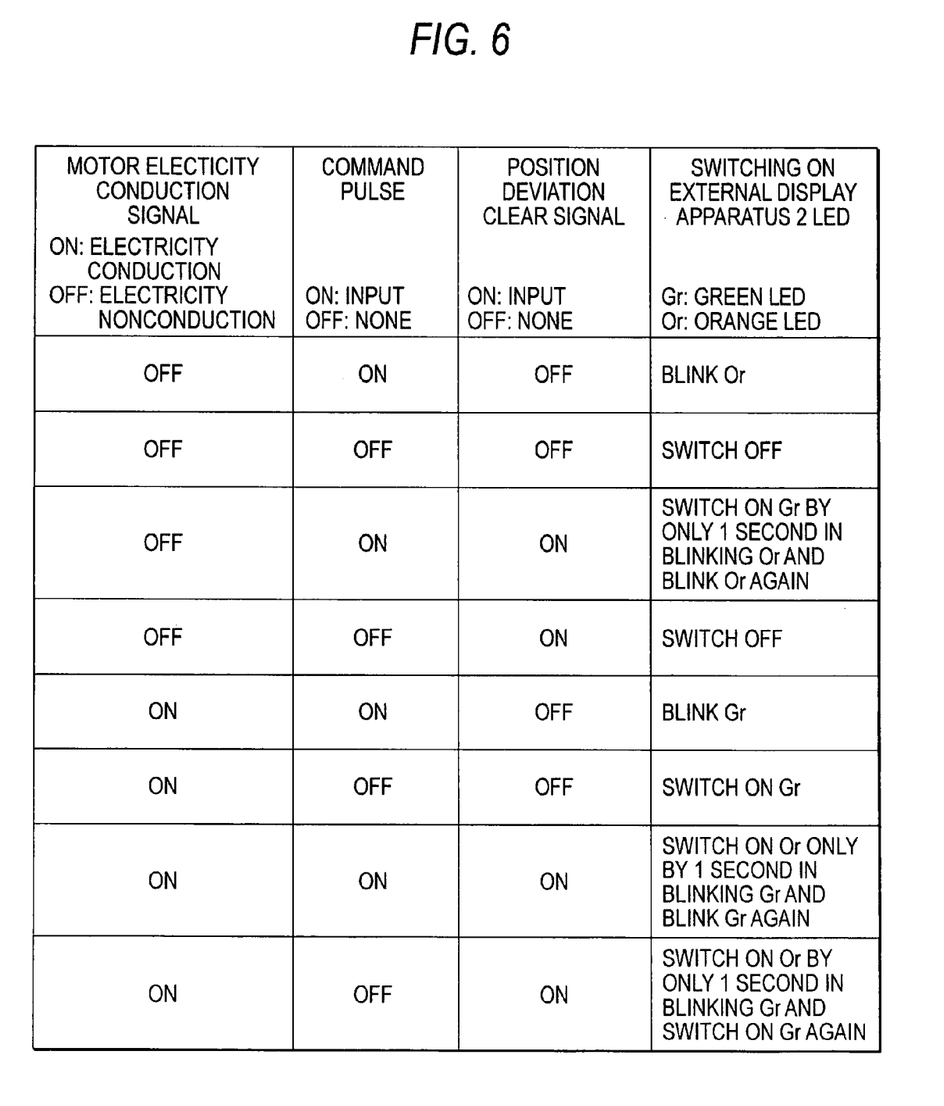
FIG. 6 is a diagram showing an outer display apparatus and an inner state of the motor control apparatus of the invention.

Numeral 24 designates the external display apparatus 2 for displaying by two colors LED or two kinds of single color LED to be able to confirm respective states of a case of inputting the power source of the motor control apparatus, or inputting a motor conducting signal to the motor control apparatus to bring the motor into the conducted state or inputting the command pulse row for driving to the motor control apparatus, or a case of forcibly clearing a positional deviation at inside of the position control portion 11 of FIG. 1 to 0. FIG. 6 shows combinations of respective three states and switching on, blinking of LED in the case as an example of the above-described. Thereby, the operating person substantially knows the state at inside of the motor control apparatus despite the few display apparatus, and is made to be able to confirm an operation content of whether the external input signal, a polarity of the command pulse row, a voltage level, an input port or the like is set normally when a user first operates the motor control apparatus by setting a digital value of a parameter or the like, and by a minimum display method in a display by operation of the invention when there is not a display apparatus.

Numeral 25 of FIG. 1 designates the alarm display apparatus, showing LED which is switched as an alarm for an abnormal state brought about at inside of the motor control apparatus when the power source of the motor control apparatus is inputted, for example, when a stable operation is difficult of when the power source voltage is abnormally high, or low, or when the motor speed exceeds a reference value, or an inner temperature of the motor control apparatus is abnormally high. The alarm display apparatus 25 of FIG. 1 is provided with three of the LEDs, and 8 ways of display can be carried out by switching on, switching off these. Further, in place of the LEDs, the display can be carried out by one or a plurality of 7 segment LED, thereby, a user can confirm the initially set operation content.

Numeral 11 designates the position control portion for constituting the speed command Vref by multiplying a deviation between a position feedback signal from the encoder 13 and the above-described position command by the position control proportional gain Kp.

A feedback angular speed Vfb is formed by processing to differentiate the positioning information of the encoder by the angular speed calculating portion 14. The speed control portion 10 calculates a torque command Tref by forming a deviation between the feedback angular speed Vfb and the speed command Vref and reducing a steady-state deviation by the speed control proportional gain Kv and a speed control integral time constant. The torque command Tref is inputted to the torque command filter 18 and the frequency analyzing portion 15.

Numeral 18 designates the torque command filter of the low pass filter for removing a high frequency component constituting an unstable component of response by the formed torque command Tref, in which the set time constant Tf is set.

Numeral 17 designates the notch filter and a filter constituting an attenuating response is set by the notch filter in order to prevent that a response in an open loop of the motor speed is large at the machine resonance frequency portion and an amplitude thereof is locally increased from the torque command with regard to the machine resonance frequency (natural frequency) provided to the machine apparatus connected to a load side of the motor 12 to interfere with the speed control proportional gain Kv.

Numeral 15 designates the frequency analyzing portion for extracting a frequency of a vibration oscillated from the feedback angular speed Vfb of the motor and the machine, from the motor speed from the angular speed calculating portion 14 and the torque command Tref constituting the output of the speed control portion 10, an equivalent rigid body observer is constituted from Vfb and Tref as shown by, for example, FIG. 4, FIG. 5 of JP-A-2003-189653, in setting the band of the observer, the speed control proportional gain Kv multiplied by α is set, an observer speed Vfbx constituting the motor speed predicted by the frequency analyzing portion is formed, and the vibration component is constituted by forming a difference from the motor speed Vfb.

$$|Vfb-Vfbx|=Vvib \quad (11)$$

The Vvib signal is subjected to an analysis to the frequency component of Fourier transformation or the like, a gain value for the frequency component is specified, from a distribution thereof, the notch filter is set to a maximum value in the frequency Nf of the maximum gain or a value of multiplying the frequency Nf by the gain in which the notch filter is provided with the response frequency of 4 through 5 times as much as the speed control proportional gain Kv. For example, when the speed control proportional gain Kv is 40 Hz, a value of about 160 through 200 Hz or more is specified. A result of the analysis in this range is conceived to correspond to the resonance frequency of a structure including the machine connected to the motor for setting the notch filter to the frequency.

Numeral 16 designates the frequency setter of the notch filter for setting the notch filter frequency Nf provided by the frequency analyzing portion to the actual notch filter portion 17. The notch filter setting portion is operated cooperatively with a change in the value of the rotary switch 2, when the notch filter frequency Nf is temporarily set, thereafter, the rotary switch 2 is changed and set value is changed, the notch filter setting portion receives again the vibration frequency at the time point from the notch filter frequency analyzing portion 15 and resets the value to the notch filter 17.

Figure 3:
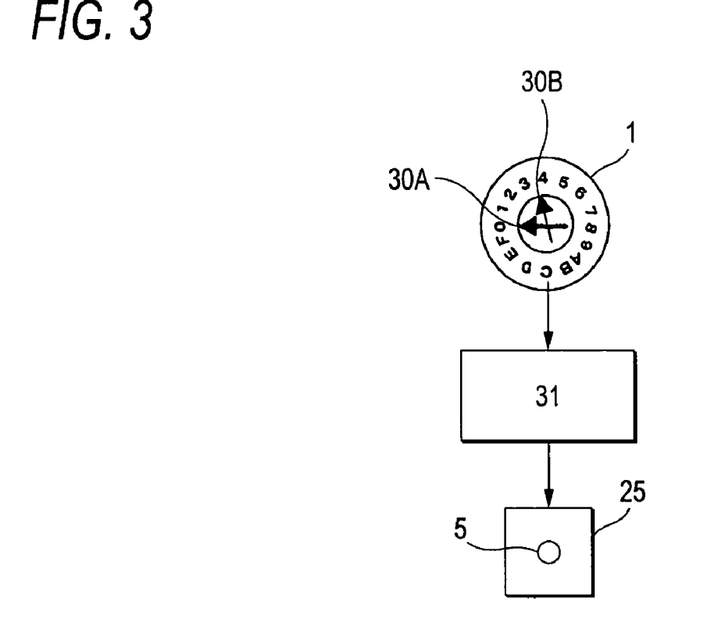
FIG. 3 is a view showing a processing of a rotary switch 1 and an alarm display apparatus (LED) of the motor control apparatus of the invention.

FIG. 3 shows a view of displaying an alarm by changing setting of the rotary switch 1.

Figure 4:
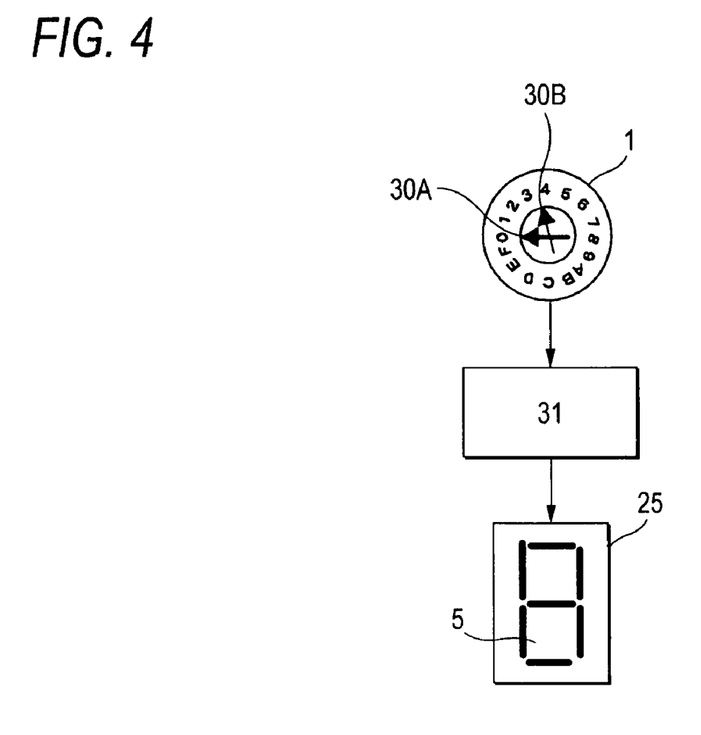
FIG. 4 is a view showing the processing of the rotary switch 1 and the alarm display apparatus (7 segment LED) of the motor control apparatus of the invention.

Notation 30B designates a switch setting before changing the rotary switch, a value in this case indicates 4, and the value of RSW1 of the pulse setting table 3 is set with a set value (CW+CCW negative logic, the command resolution of 1000 pulses/ref) of a column of 4. Notation 30A designates a set value after changing the switch, in this case, showing 0 (CW+CCW positive logic, the command resolution 1000 pulses/ref). When the set value of 32B is changed to set value of 30A during a time period of inputting the power source, the set value is not made to be effective but an output signal to 4 of the alarm display apparatus is transmitted. In FIG. 4, the display apparatus can also constitute an alarm by a numeral or a combination of respective LED by utilizing 7 segment LED. In this case, the command pulse mode or the command resolution is changed during the time period of being operated or inputting the power source, the position deviation becomes extremely large, the motor shaft becomes vibratory and therefore, the case is dangerous. Therefore, the operating person is alarmed, and when changed, the set value of 30A is made to be effective by carrying out an action of inputting the power source once more again.

Figure 5:
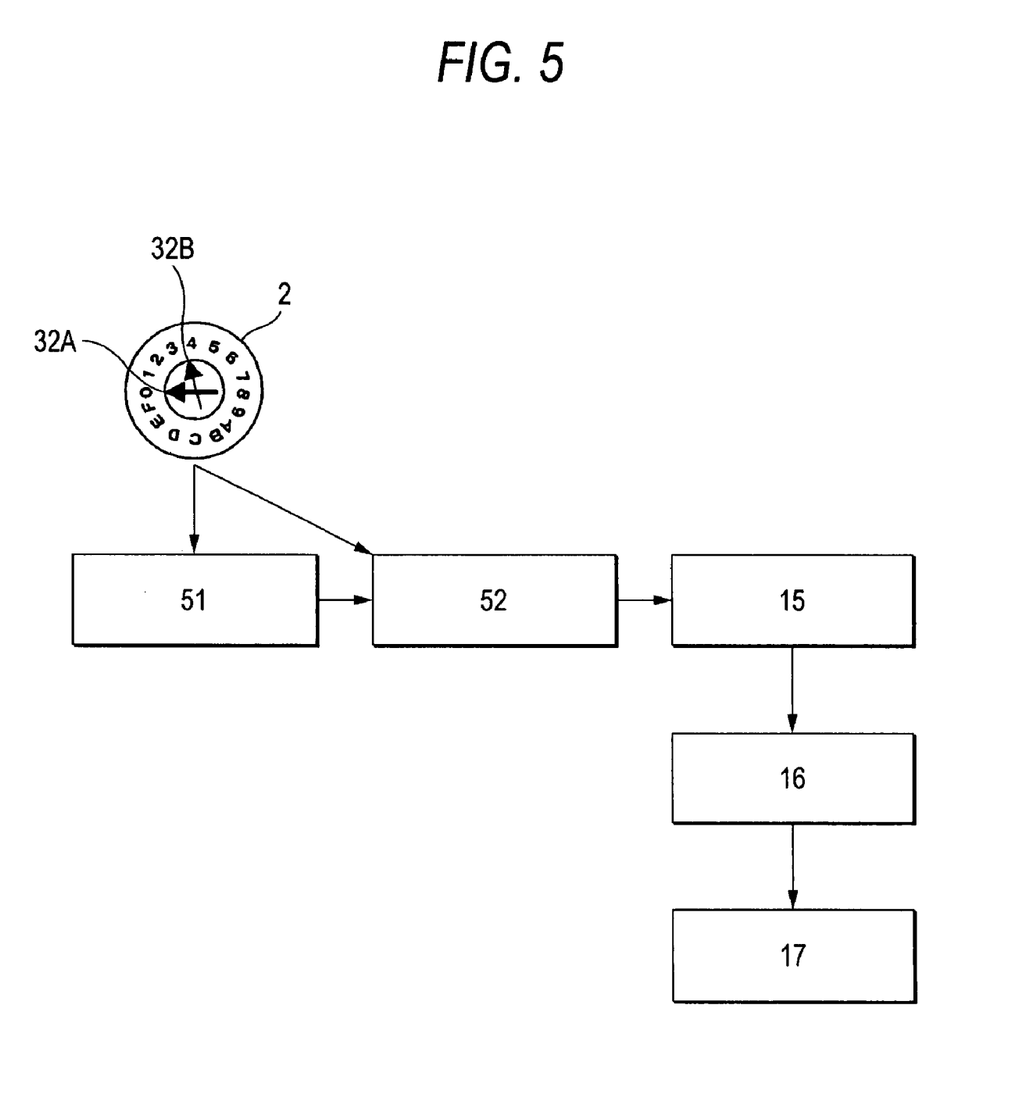
FIG. 5 is a view showing a processing of a rotary switch 2 and an alarm display apparatus of the motor control apparatus of the invention.

FIG. 5 shows a view of detecting, resetting the notch filter setting frequency by setting gain, filter or changing the set value by changing to set the rotary switch 2. Notation 32B is set with 4 as a value before changing the rotary switch 2. Notation 32A shows a set value of 0 after changing the rotary switch 2. Here, when 4 indicated by 32B is set during the time period of inputting the power source, the set value is stored instantly to an involatile memory of the rotary switch 2 setting and storing portion 51. Thereafter, when the power source is inputted while the set value is being changed to a setting of 0 indicated by 32A even in a case of shutting off the power source, the rotary switch 2 resetting portion 52 compares information from the rotary switch 2 setting and storing portion 51 and a value of the set value 4 of 32A which is currently set, and it is recognized that the rotary switch 2 is changed before and after inputting the power source since setting of 32B and setting of 32A or set values 4 and 0 differ from each other between a preceding time and a current time. Since the setting is changed, whether the vibration is newly generated or the frequency at that occasion is analyzed by the vibration frequency analyzing portion 5. Thereafter, the setting is finally determined by the vibration frequency setting portion 4 and is set to the notch filter 17.

A portion of the invention which differs from the background art will be explained. First, according to the background art, a control gain is selected, the combination is determined, and the motor control apparatus is set, and therefore, in addition to the motor control apparatus, the parameter setting apparatus is needed, and fabrication cost therefor is taken. Further, the person of operating the motor control apparatus needs to carry out the operation in accordance with the setting method, and the setting mode needs to be switched. In the case of the invention, the parameter setting apparatus is not needed, the control gain can be set by the inexpensive rotary switch 1, the fabrication cost can considerably be reduced, the person of operating the motor control apparatus needs not to follow the troublesome method of setting of the parameter setting apparatus but may only prolong the command filter time constant by only switching the rotary switch while confirming the operating state and may only switch the setting until stabilizing the response in operation.

Further, there is a case in which the vibration by the machine resonance frequency is generated when the machine is driven first by the motor control apparatus, and the case is found after actually operating the machine. In this case, the setting of the machine resonance filter needs to be set by operating the parameter setting apparatus, when the vibration is large, there is also a case of destructing the machine or inflicting an injury on the operating person or a person at a periphery of the machine. Therefore, when the motor control apparatus is operated first, it is necessary to operate the machine after devising a safety measure of rapidly shutting off electricity conductions of the motor always by an emergency stop apparatus or the like. According to the invention, the notch filter frequency automatically detects whether the vibration is present immediate after conducting electricity to the motor, when the vibration is present by a certain constant level or more, the vibration frequency is determined, and the notch filter frequency is automatically set to the vibration frequency. Further, according to the invention, there is provided a portion having a function for carrying out from detection to automatic setting of the frequency again by only switching the rotary switch even when the vibration frequency differs by significantly changing the characteristic of the motor control apparatus.

INDUSTRIAL APPLICABILITY

Although the invention relates to the motor control apparatus of the pulse row input type, the item of the command resolution of the pulse setting table 3 can be used as it is by providing a function of communicating to transmit and receive with the higher order apparatus in place of the pulse inputting apparatus of FIG. 1 and inputting position command data from the higher order apparatus to the motor control apparatus. Therefore, the invention is applicable also to a use of setting a gain and setting a filter of the motor control apparatus having a communicating function.

Further, the invention is applicable also to a motor control apparatus which is not provided with the pulse row inputting apparatus nor the function of transmitting and receiving the position data by communication and can set the plurality of position data to an involatile storing apparatus in an command mode of successively moving the plurality of positions arbitrarily or by a previously set order.

The invention claimed is:

1. A motor control apparatus comprising:
   a speed control portion including a proportional integral calculating portion for controlling an angular speed of a motor,
   a position control portion including a proportional integral calculating portion for controlling an angle of the motor,
   a setting portion for setting values of a proportional gain (Kv) of the position control portion, a proportional gain (Kv) of the speed control portion, an integral time constant (Ti) of the speed control portion, a low pass filter time constant (Tf) of a torque command filter for inputting a torque command outputted from the speed control portion, and a low pass filter time constant (Tp) of a position acceleration/deceleration filter arranged at a prestage of the position control portion for smoothing a rapid variation in a position command, and
   a first switching portion allocated with the values of the speed control proportional gain Kv, the position control proportional gain Kp, the speed control integral time constant Ti, the torque command low pass filter Tf, and the position command low pass filter time constant Tp in steps by certain constant rates relative to the set values or arbitrary values.

2. The motor control apparatus according to claim 1, further comprising:
   an command pulse selecting portion for selecting a code signal and a pulse row, or a regular rotation row command and an inverse rotation pulse row command as an command of a pulse row command of the position command, selecting a logic of the pulse signal, and selecting an command resolution, and
   a second switching portion allocated with respective set values of the command pulse selecting portion.

3. The motor control apparatus according to claim 2, further comprising:
   a change detecting portion for detecting that the second switching portion is changed in inputting the power source.

4. The motor control apparatus according to claim 3, wherein
   an alarm is displayed at an alarm display portion when the second switching portion is changed in inputting the power source at the change detecting portion.

5. The motor control apparatus according to claim 4, wherein
   a light emitting portion of the alarm display portion LED or a liquid crystal is switched on or intermittently blinked.

6. The motor control apparatus according to claim 3, wherein
   after the second switching portion is changed and an alarm display portion issues an alarm in inputting the power source, when returned to a position before the change again, a display of the alarm at the alarm display portion is stopped.

7. The motor control apparatus according to claim 1, further comprising:
   an external display portion for inputting a motor electricity conduction signal and displaying at least one of whether the motor is brought into a conductive state, whether the command pulse row is correctly inputted, and whether a signal of clearing a position deviation to null is inputted.

8. The motor control apparatus according to claim 1, further comprising:
   an external display portion capable of informing an operating person of a content of a case of bringing about an abnormality in the motor control apparatus.

9. The motor control apparatus according to claim 1, wherein
   the first switching portion is a rotary switch or a dip switch or a piano switch.

10. A motor control apparatus comprising:
    a speed control portion including a proportional integral calculating portion for controlling an angular speed of a motor,
    a position control portion including a proportional integral calculating portion for controlling an angle of the motor,
    a setting portion for setting values of a proportional gain (Kp) of the position control portion, a proportional gain (Kv) of the speed control portion, an integral time constant (Ti) of the speed control portion, a low pass filter time constant (Tf) of a torque command filter for inputting a torque command outputted from the speed control portion,
    a notch filter,
    a notch filter setting portion thereof arranged at a post stage of the torque command filter,
    a first switching portion allocated with the values of the speed control proportional gain Kv, the position control proportional gain Kp, the speed control integral time constant Ti, the torque command low pass filter Tf by certain constant rates relative to the set values or arbitrary values, and
    a setting portion for releasing instantly the notch filter set with a notch filter setting before changing the first switching portion by switching to set the first switching portion, resetting the notch filter frequency value from the vibration frequency analyzing portion to the torque command value as a new output immediate after switching the first switching portion, and simultaneously setting the set value to the setting storing portion.

11. The motor control apparatus according to claim 10, further comprising:
    a setting storing portion for storing the set value of the first switching portion always in an involatile memory.

12. The motor control apparatus according to claim 10, wherein
    in resetting the notch filter, in a case of shutting off a power source of the motor control apparatus, when the first switching portion is changed, the set value of the first switching portion in inputting the power source at a preceding time which is stored to the setting storing portion in an initializing processing in inputting the power source and the set value of the first switching portion in inputting the power source at a current time are compared, and the notch filter is reset only when the values differ from each other.

13. The motor control apparatus according to claim 10, wherein
    the notch filter setting portion is operated cooperatively with a change in the value of the first switching portion, the first switching portion is changed after temporarily setting the notch filter frequency Nf, when the set value is changed, the vibration frequency at the time point is received again from the frequency analyzing portion, and a value thereof is set again to the notch filter.

14. The motor control apparatus according to claim 10, further comprising:
- an command pulse selecting portion for selecting a code signal and a pulse row, or a regular rotation row command and an inverse rotation pulse row command as an command of a pulse row command of the position command, selecting a logic of the pulse signal, and selecting an command resolution, and
- a second switching portion allocated with respective set values of the command pulse selecting portion.

15. The motor control apparatus according to claim 10, further comprising:
- an external display portion for inputting a motor electricity conduction signal and displaying at least one of whether the motor is brought into a conductive state, whether the command pulse row is correctly inputted, and whether a signal of clearing a position deviation to null is inputted.

16. The motor control apparatus according to claim 10, further comprising:
- an external display portion capable of informing an operating person of a content of a case of bringing about an abnormality in the motor control apparatus.

17. The motor control apparatus according to claim 10, wherein
- the first switching portion is a rotary switch or a dip switch or a piano switch.

* * * * *